(12) United States Patent
Kawasaki et al.

(10) Patent No.: US 7,031,743 B2
(45) Date of Patent: Apr. 18, 2006

(54) FOLDABLE PORTABLE COMMUNICATION TERMINAL DEVICE

(75) Inventors: Hideji Kawasaki, Neyagawa (JP); Hiroomi Kashu, Moriguchi (JP); Shuji Otsuka, Higashiosaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 665 days.

(21) Appl. No.: 09/986,575

(22) Filed: Nov. 9, 2001

(65) Prior Publication Data

US 2002/0058527 A1    May 16, 2002

(30) Foreign Application Priority Data

Nov. 14, 2000    (JP)    ............... 2000-347094

(51) Int. Cl.
*H04M 1/00*    (2006.01)
(52) U.S. Cl. ............... 455/550.1; 455/572; 455/575.1; 455/573.1
(58) Field of Classification Search ............ 455/127.1, 455/550.1, 572, 575.1, 573.1, 575.3
See application file for complete search history.

(56) References Cited

U.S. PATENT DOCUMENTS 5,953,413 A * 9/1999 Peyer et al. ........... 379/433.06
5,966,671 A * 10/1999 Mitchell et al. ......... 455/550.1

(Continued)

FOREIGN PATENT DOCUMENTS

| JP | 09-321839 | 12/1997 |
|---|---|---|
| JP | 2002-510169 | 4/2002 |
| KR | 2001-27047 | 4/2001 |
| WO | WO 98/38779 | 9/1998 |

(Continued)

OTHER PUBLICATIONS

Notice of Reasons of Rejection mailed on Dec. 2, 2003 for the corresponding Japanese Patent Application No. 2000-347094.

*Primary Examiner*—Curtis Kuntz
*Assistant Examiner*—Tuan Pham
(74) *Attorney, Agent, or Firm*—Armstrong, Kratz, Quintos, Hanson & Brooks, LLP

(57) ABSTRACT

The present invention provides a foldable portable communication terminal device including a main body case and a lid case openably connected. The main body case has a side portion provided with an up key and a down key. The portable communication terminal device has a secondary battery, power supplying switch, and a control circuit incorporated therein. The control circuit switches the power supply switch to on/off when the up key and the down key are held depressed at the same time for at least the predetermined period of time. This starts or stops power supply from the secondary battery to the device body to switch the power source of the device body to on/off. Accordingly, the foldable portable communication terminal device can be realized which is adapted to turn off the power source of the device body with the main body case and the lid case folded together.

3 Claims, 4 Drawing Sheets

U.S. PATENT DOCUMENTS

| | | | |
|---|---|---|---|
| 6,269,256 B1 * | 7/2001 | Nakamura | 455/567 |
| 6,282,435 B1 * | 8/2001 | Wagner et al. | 455/566 |
| 6,424,844 B1 * | 7/2002 | Lundqvist | 455/566 |
| 6,453,169 B1 * | 9/2002 | Maloney | 455/575.1 |
| 6,748,243 B1 * | 6/2004 | Kubo et al. | 455/569.1 |
| 2002/0045467 A1 * | 4/2002 | Hama | 455/567 |
| 2002/0094826 A1 * | 7/2002 | Lee | 455/457 |
| 2005/0020305 A1 * | 1/2005 | Callaghan et al. | 455/556.2 |
| 2005/0085263 A1 * | 4/2005 | Kim et al. | 455/556.1 |

FOREIGN PATENT DOCUMENTS

| | | |
|---|---|---|
| WO | WO 99/37077 | 7/1999 |

* cited by examiner

FOLDABLE PORTABLE COMMUNICATION TERMINAL DEVICE

FIELD OF THE INVENTION

The present invention relates to foldable portable communication terminal devices capable of carrying as folded such as foldable portable telephones having a main body case and a closure case connected to the main body case openably.

BACKGROUND OF THE INVENTION

Foldable portable telephones include a main body case and a lid case which are foldable into a compact form for carrying and which are opened for making or receiving a call to expose a manual key arrangement and a speech delivery portion provided on an inner surface of the main body case and to expose a display screen and a speech receiving portion provided on the inner surface of the lid case, so that the user can speak with a calling party.

Such foldable portable telephones are not only convenient to carry but also free of the likelihood that some keys will be inadvertently depressed when the telephone is carried as placed in a bag or the like since the manual keys are then covered with the lid case, hence security.

However, the conventional portable telephones have a manual key for turning on/off a power source of a device body provided on an inner surface of a main body case, so that when the user is to turn off the power source of the device body, for example, before attending a meeting in order to avoid receiving a call during the meeting, the user needs to open the lid case to manipulate the manual key, and then still needs to close the lid case, entailing the problem of cumbersomeness in open-close manipulation of the lid case.

SUMMARY OF THE INVENTION

An object of the present invention is to provide a foldable portable communication terminal device wherein a power source of a device body can be turned off with a main body case and a lid case folded together.

The present invention provides the foldable portable communication terminal device comprising a casing having a main body case and a lid case openably connected thereto. The casing includes a power source circuit for supplying power to a device body, an on/off circuit for turning on/off power supply from the power source circuit to the device body, and a power supply control circuit for controlling operation of the on/off circuit. The casing has one or a plurality of manual keys so arranged on a position as to be depressed with the casing closed. The power supply control circuit turns off the on/off circuit when the one or the plurality of manual keys are held depressed for at least the predetermined period of time.

With the foldable portable communication terminal device of the present invention, the one or the plurality of manual keys arranged on the casing are held depressed for at least the predetermined period of time to turn off the on/off circuit, stopping the power supply from the power source circuit to the device body, causing the power source of the device body to be turned off. In this step, the one or the plurality of manual keys are so arranged on positions as to be depressed with the casing closed, so that when the power source of the device body is to be turned off, the lid case needs not to be opened or closed. Accordingly, with the foldable portable communication terminal device of the invention, the power source of the device body can be turned off with the main body case and the lid case folded together.

Further, with the foldable portable communication terminal device of the invention, even if the one or the plurality of manual keys are depressed for shorter than the predetermined period of time, the power source of the device body is not turned off. Only when the manual keys described are held depressed for at least the predetermined period of time, the power source of the device body is turned off. Consequently, when the device, for example, is carried as placed in a bag, it is prevented that the power source of the device body is inadvertently switched off since an article in the bag depresses the one or the plurality of manual keys.

Stated specifically, the device has a plurality of manual keys so arranged on positions as to be depressed with the casing closed. The power supply control circuit turns off the on/off circuit when the plurality of manual keys are held depressed at the same time for at least the predetermined period of time. As described above, there is extremely low possibility that an article in the bag will touch and depress the plurality of manual keys at the same time, and the keys will be held depressed for at least the predetermined period of time. Thus the specific construction stated above can reliably prevent the power source of the device body from being switched off inadvertently.

Further stated specifically, the plurality of manual keys each are changed over between different functions depending on whether the casing is opened or closed. Development in information technology in recent years enables a portable communication terminal device to be equipped with increased functions. If the portable communication terminal device having various functions has one manual key for one function mounted thereon, the device body becomes greater in size.

According to the specific construction described, the one or the plurality of manual keys are provided with different functions, respectively, depending on whether the casing is opened or closed, so that the number of manual keys to be mounted on the device body is decreased to diminish the size of the device body.

Stated more specifically, the plurality of manual keys include two manual keys, and the casing has a display exposed to the outside with the casing closed. The two manual keys each perform the function of a volume up key or a volume down key for adjusting volume of incoming speech with the casing opened, while the keys each perform the function of a scroll up key or a scroll down key for scrolling the display with the casing closed.

With the foldable portable communication terminal device having the specific construction described, when the casing is in its opened state, the user can speak with a calling party, and the two manual keys each perform the function of a volume up key or a volume down key for adjusting volume of incoming speech. When the casing is in its closed state, the user can view the display, and the two manual keys each perform the function of a scroll up key or a scroll down key for scrolling the display.

As stated above, according to the foldable portable communication terminal device embodying the invention, the power source of the device body can be turned off with the main body case and the lid case closed.

DETAILED DESCRIPTION OF EMBODIMENTS

Figure 1:
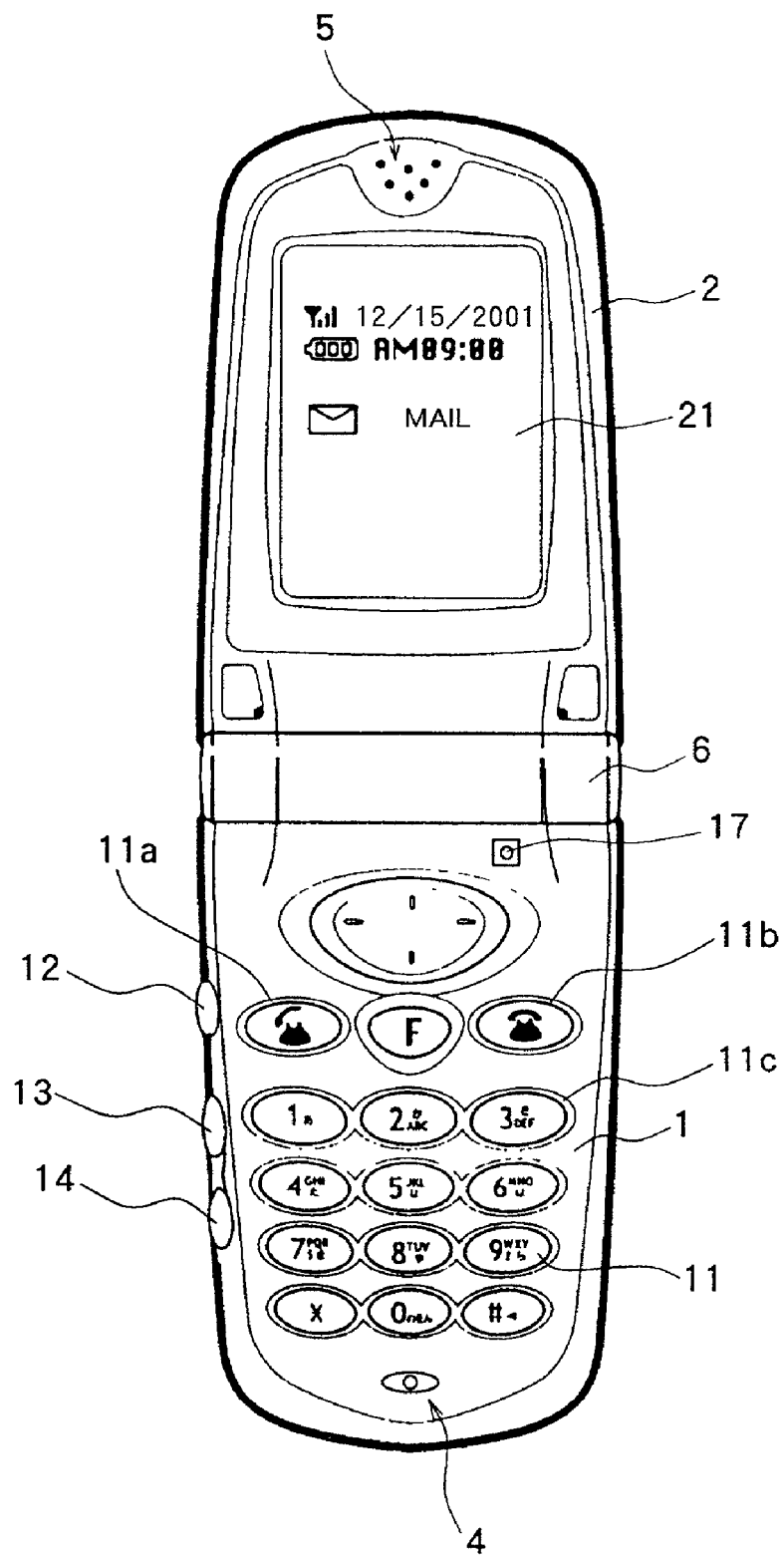
FIG. 1 is a perspective view showing a foldable portable telephone when in opened state according to the present invention.
Figure 2:
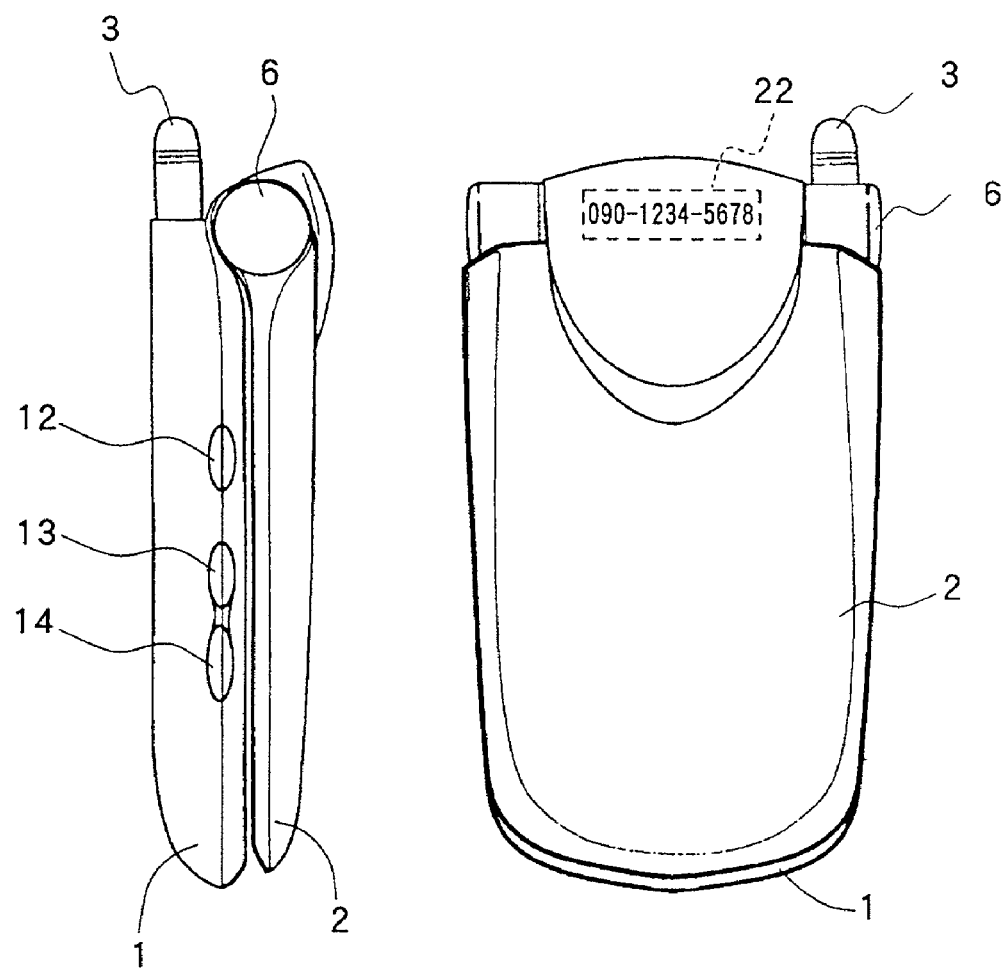
FIGS. 2(a) and 2(b) are perspective views showing the foldable portable telephone when in closed state.

The present invention as applied to a foldable portable telephone will be described below with reference to the drawings. The foldable portable telephone of the invention includes a flat main body case 1 and a lid case 2, as shown in FIG. 1, FIG. 2(a), and FIG. 2(b). An upper end of the main body case 1 and a lower end of the lid case 2 are connected to each other by a hinge mechanism 6. Open-close manipulation can be performed from an opened state of the lid case 2 as shown in FIG. 1 to a closed state of the lid case 2 as shown in FIGS. 2(a) and 2(b). A foldable casing is thus constructed.

The main body case 1 has a rear portion provided with an extensible antenna 3. The main body case 1 has an inner surface provided with a group of inner surface manipulating keys 11 including an offhook key 11a, an onhook key 11b, and numerical keys 11c, etc. The inner surface has a lower end portion provided with a speech delivery portion 4 incorporating a microphone. Arranged on the inner surface of the main body case 1 is an open-close detection switch 17 for detecting open-close state of the lid case 2. The open-close detection switch 17 is turned on by closing the lid case 2, and is turned off by opening the lid case 2.

The portable telephone described comprises a message key 12, an up key 13, and a down key 14. These keys 12, 13, 14 are so arranged on a side portion of the main body case 1 as to be exposed to the outside even when the lid case 2 is in its closed state. Accordingly, the keys can be depressed not only when the lid case 2 is in its open state, as shown in FIG. 1, but also when the lid case 2 is in its closed state, as shown in FIGS. 2(a) and 2(b). The message key 12, the up key 13, and the down key 14 each perform different functions depending on whether the lid case 2 is opened or closed, as will be discussed below.

On the other hand, the lid case 2 has an inner surface provided with a main display 21. The inner surface has an upper end portion provided with a speech receiving portion 5 incorporating a speaker. The main display 21 shows date and time, various menus, content of a received message, a telephone number and name of the caller when an incoming call is received, or a telephone number of a calling party when the user makes a call and the like in the same manner as in the prior art.

The lid case 2 has a rear portion provided with an auxiliary display 22 as shown in FIG. 2(b). The auxiliary display 22 shows the number of incoming calls and received messages, a telephone number of the caller when a call is received, name of a received message sender, and content of a received message, etc.

Figure 3:
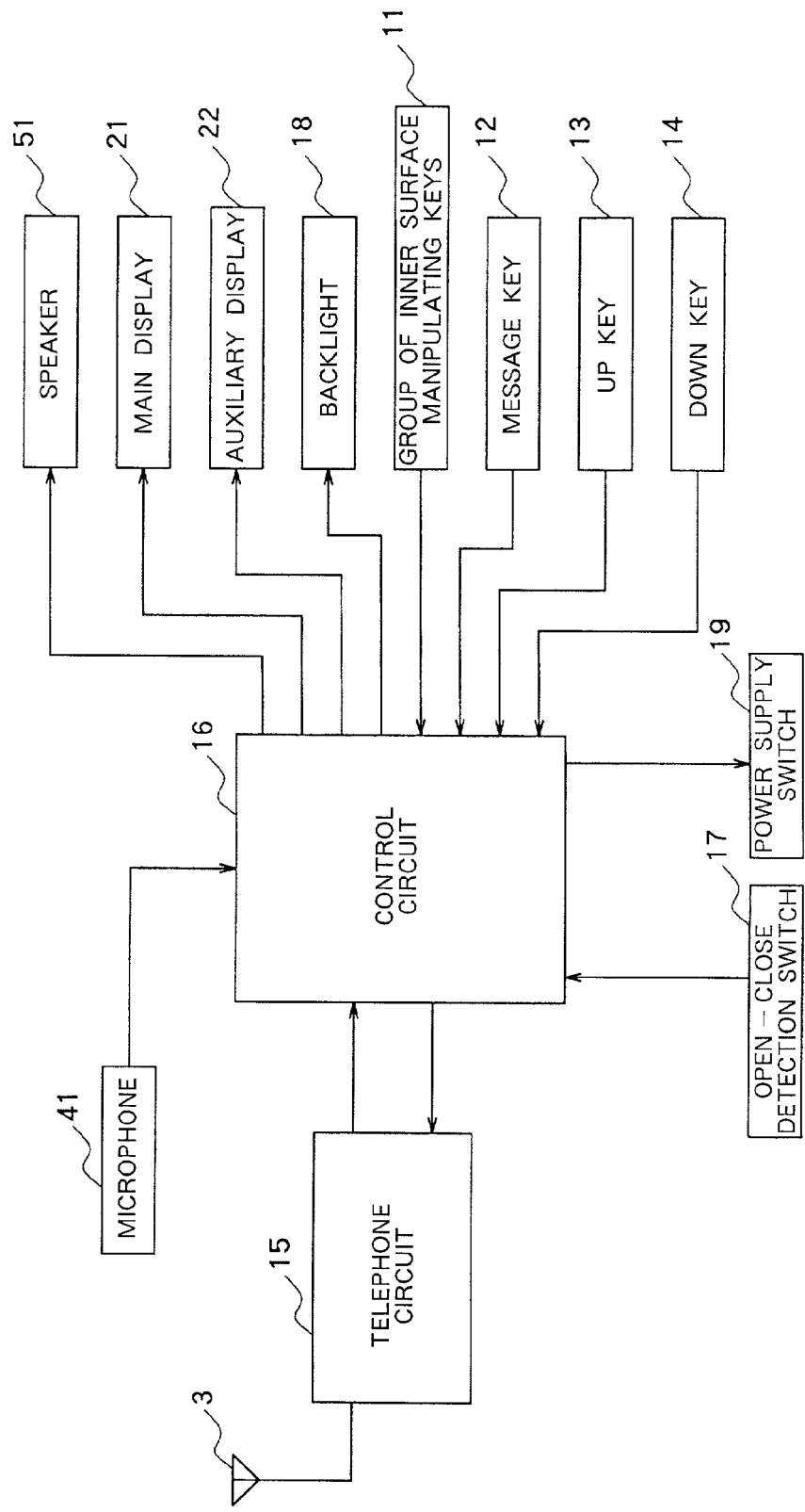
FIG. 3 is a block diagram showing electrical construction of the foldable portable telephone.

FIG. 3 shows the electrical construction of the foldable portable telephone described above. With the foldable portable telephone, a telephone circuit 15 is connected to the extensible antenna 3 as illustrated, and processes the signal for a call and data communication with other portable telephone or with an ordinary telephone connected to the subscriber's telephone line.

The operation of the telephone circuit 15 is controlled by a control circuit 16 having a microcomputer. A microphone 41 and a speaker 51 are connected to the control circuit 16, respectively, so that the voice of outgoing speech can be inputted, and the voice of incoming speech can be outputted.

Connected to the circuit 16 are the main display 21, the auxiliary display 22, the group of inner surface manipulating keys 11, the message key 12, the up key 13, and the down key 14, respectively. A backlight 18 is also connected to the circuit 16 for illuminating a display surface of the main display 21 and the auxiliary display 22. The open-close detection switch 17 is connected to the circuit 16.

Further, the foldable portable telephone incorporates a secondary battery (not shown) serving as a power source. Connected to the control circuit 16 is a power supply switch 19 for turning on/off the supply of power from the secondary battery to the telephone circuit 15, the microphone 41, the speaker 51, the main display 21, the auxiliary display 22, and the backlight 18, respecitvely. The switch 19 is on/off-controlled by the control circuit 16. When the switch 19 is turned on, the supply of the power from the secondary battery to the telephone circuit 15, the microphone 41, the speaker 51, the main display 21, the auxiliary display 22, and the backlight 18 is started. On the other hand, when the switch 19 is turned off, the supply of the power from the secondary battery to the telephone circuit 15, the microphone 41, the speaker 51, the main display 21, the auxiliary display 22, and the backlight 18 is stopped. The power source of the device body is thus set to an on/off state.

With the foldable portable telephone, when the power source of the device body is off, the up key 13 and the down key 14 are held depressed at the same time for at least the predetermined period of time with the lid case 2 closed to cause the power source to be turned on. Further, in the same manner as in the prior art, the onhook key 11b is held depressed for at least the predetermined period of time with the lid case 2 opened to cause the power source to be turned on.

The onhook key 11a and the numerical keys 11c are thereafter manipulated with the lid case 2 opened, so that the user can speak with a calling party using the speech delivery portion 4 and the speech receiving portion 5.

With the lid case 2 opened, the message key 12 described performs a function stated below. The message key 12 is held depressed for at least the predetermined period of time during incoming call waiting state to set or cancel a message mode for answering with a message, for example, saying "I am not available to speak on the phone now" when there is an incoming call. The message key 12 is held depressed for at least the predetermined period of time while the user speaks with a calling party to start recording content of talking on the phone, and is thereafter held depressed again for at least the predetermined period of time to stop recording. The message key 12 is held depressed for at least the predetermined period of time upon receiving an incoming call, immediately executing answering operation of reproducing the message, for example, "I am not available to speak on the phone now." Further, the message key 12 is depressed for shorter than the predetermined period of time to have information on the message mode including the content of the message stated above, etc. shown on the main display 21.

On the other hand, when the lid case 2 is in its closed state, the message key 12 performs the function stated below. In the case where the message key 12 is held depressed for at least the predetermined period of time during incoming call waiting state, or in the case where the key 12 is held depressed for at least the predetermined period of time while the user speaks with a calling party, or in the case where the key 12 is held depressed for at least the predetermined period of time when an incoming call is received, the message key 12 performs the same function as when the lid case 2 is in its open state. In other words, the message key 12 is held depressed for at least the predetermined period of time during incoming call waiting state to set/cancel the message mode. The key 12 is held depressed for at least the predetermined period of time while the user speaks with a calling party to start/stop recording content of talking on the phone. Immediately when the key 12 is held depressed for at least the predetermined period of time upon receiving an incoming call, the answering operation of the message reproducing is executed. Further, the message key 12 is depressed for shorter than the predetermined period of time to turn on the backlight 18 and illuminate the auxiliary display 22.

When the lid case 2 is in its open state, the up key 13 and the down key 14 perform functions stated below. The up key 13 or the down key 14 is depressed during incoming call waiting state or while the user speaks with a calling party, increasing or decreasing volume of received speech. When various menus or content of the received message are shown on the main display 21, the up key 13 or the down key 14 is depressed, scrolling up or down those shown on the display. When there is an incoming call, the up key 13 or the down key 14 is depressed, increasing or decreasing the volume of ring tone.

On the other hand, when the lid case 2 is in its closed state, the up key 13 and the down key 14 perform functions stated below. The up key 13 or the down key 14 is depressed during incoming call waiting state, successively having various information including the number of incoming calls and the number of received messages, etc. shown on the auxiliary display 22. The up key 13 or the down key 14 is depressed with the content of the message shown on the auxiliary display 22, scrolling up or down those shown on the display 22. When there is an incoming call, the up key 13 or the down key 14 is depressed, increasing or decreasing the volume of ring tone in the same manner as in the lid case 2 open state.

When the lid case 2 is in its closed state with the power source of the device body set to on, as described above, the up key 13 and the down key 14 are held depressed at the same time for at least the predetermined period of time, turning off the power source. In the same manner as in the prior art, when the lid case 2 is in its open state, the onhook key 11*b* is held depressed for at least the predetermined period of time, turning off the power source.

Figure 4:
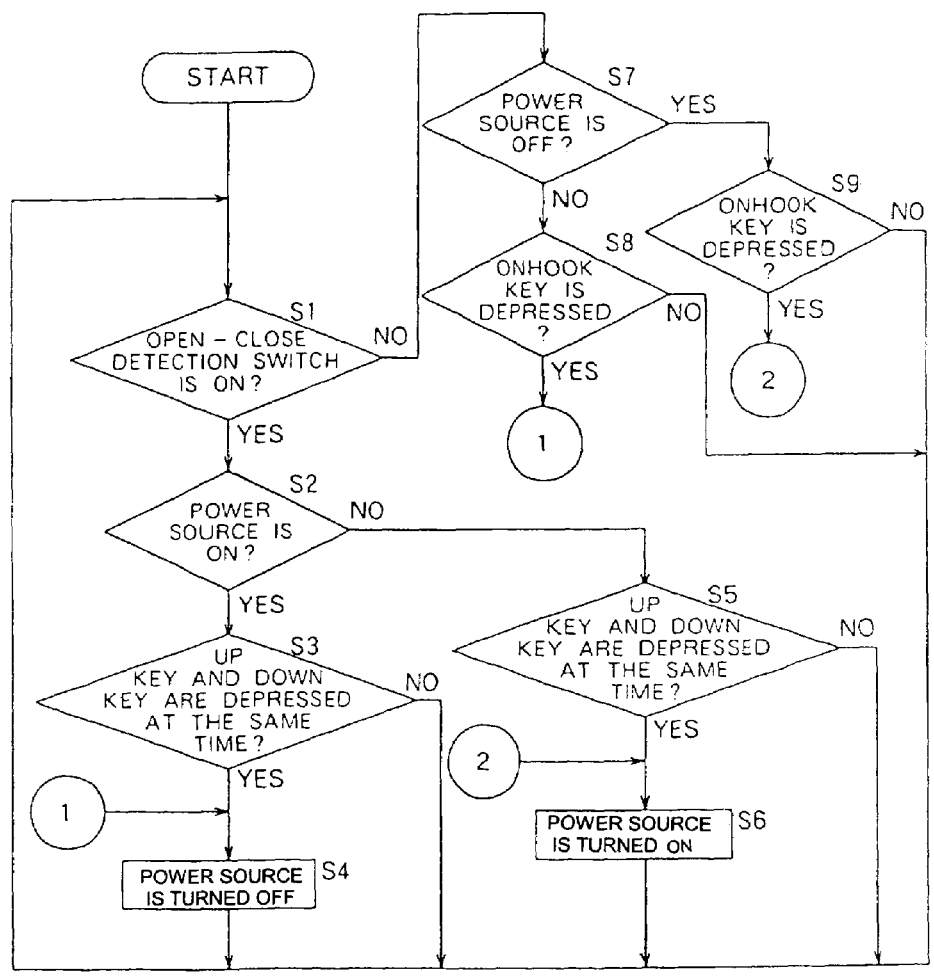
FIG. 4 is a flow chart showing control operation of the foldable portable telephone partially.

FIG. 4 shows the procedure of switching on/off the power source of the device body executed by the control circuit 16 described. When the user turns on the power source of the foldable portable telephone described for the first time, required initial setting like setting ports is performed.

As illustrated, step S1 inquires as to whether the open-close detection switch 17 is turned on. When the lid case 2 is in its closed state, the answer for the step S1 is affirmative, followed by step S2 to inquire as to whether the power source is turned on. If the inquiry is answered in the affirmative, step S3 follows to inquire as to whether the up key 13 and the down key 14 are held depressed at the same time for at least the predetermined period of time. If the inquiry is answered in the affirmative, the sequence proceeds to step S4 to turn off the power source, and thereafter returns to step S1, while if the inquiry is answered in the negative, step S4 is skipped, and the sequence returns to step S1.

If the answer for step S2 is negative, step S5 follows to inquire as to whether the up key 13 and the down key 14 are depressed at the same time for at least the predetermined period of time. If the inquiry is answered in the affirmative, the sequence proceeds to step S6 to turn on the power source, and thereafter returns to step S1, whereas if the inquiry is answered in the negative, step S6 is skipped and the sequence returns to step S1.

When the lid case 2 is in its open state, the answer for step S1 is negative, followed by step S7 to inquire as to whether the power source is turned off. If the inquiry is answered in the negative, step S8 follows to inquire as to whether the onhook key 11*b* is held depressed for at least the predetermined period of time. If the answer is negative, the sequence returns to step S1, while if the answer is affirmative, the sequence proceeds to step S4 to turn off the power source, and thereafter returns to step S1.

If the answer is affirmative in step S7, step S9 follows to inquire as to whether the onhook key 11*b* is held depressed for at least the predetermined period of time. When the inquiry is answered in the negative, the sequence returns to step S1. When the inquiry is, on the other hand, answered in the affirmative, step S6 follows to turn on the power source, and the sequence returns to step S1.

With the foldable portable telephone of the invention, the up key 13 and the down key 14 provided on a side portion of the main body case 1 are held depressed at the same time for at least the predetermined period of time with the main body case 1 and the lid case 2 folded together, which can switch on/off the power source of the device body, as described above. Accordingly, when the power source of the device body is switched on/off, the user needs not to open or close the lid case 2, hence a simple procedure in switching on/off.

With the foldable portable telephone described, when the up key 13 and the down key 14 are held depressed at the same time for at least the predetermined period of time, the power source is switched on/off. In the case where the telephone is carried as placed in a bag, for example, there is extremely low possibility that the up key 13 and the down key 14 are touched and depressed by an article in the bag at the same time, and the keys 13, 14 are held depressed for at least the predetermined period of time. Therefore, it is unlikely that the power source is switched on/off inadvertently.

Furthermore, the message key 12, the up key 13, and the down key 14 each perform different functions depending on whether the lid case 2 is opened or closed. Consequently, the number of the manual keys is smaller than the case wherein one manual key is formed for one function, whereby the device body is made compact.

The embodiment described above is intended to illustrate the present invention and should not be construed as limiting the invention set forth in the appended claims or reducing the scope thereof. Furthermore, the device of the invention is not limited to the embodiment in construction but can of course be modified variously without departing from the scope of the invention as set forth in the claims.

For example, according to the embodiment described, when the up key 13 and the down key 14 are held depressed at the same time for at least the predetermined period of time, the power source is switched on/off. The invention is, however, not limited to the above, and it is possible to use the construction wherein the power source is switched on/off when one of the message key 12, the up key 13, and the down key 14 is held depressed for at least the predetermined period of time, or when all the keys 12, 13, 14 are held depressed at the same time for at least the predetermined period of time.

What is claimed is:

1. A foldable portable telephone comprising a casing having a main body case and a lid case openably connected thereto and having a power source circuit for supplying power to a device body, an on/off circuit for turning on/off power supply from the power source circuit to the device body, and a power supply control circuit for controlling operation of the on/off circuit, the casing having a plurality of manual keys so arranged in positions whereby said manual keys can be depressed with the casing closed, the power supply control circuit turning off the on/off circuit when the plurality of manual keys are simultaneously held depressed for at least a predetermined period of time following detection of the lid case being closed, and not turning off the on/off circuit following detection of the lid case being open.

2. A foldable portable communication terminal device according to claim 1 wherein the plurality of manual keys each are changed over between different functions depending on whether the casing is opened or closed.

3. A foldable portable communication terminal device according to claim 2 wherein the plurality of manual keys comprises two manual keys, the casing has a display exposed to the outside with the casing closed, and the two manual keys each perform a function of a volume up key or a volume down key for adjusting volume of incoming speech with the casing opened, while the keys each perform a function of a scroll up key or a scroll down key for scrolling the display with the casing closed.

* * * * *